US010094502B2

(12) United States Patent
Tiberghien et al.

(10) Patent No.: US 10,094,502 B2
(45) Date of Patent: Oct. 9, 2018

(54) MALE OR FEMALE QUICK COUPLING ELEMENT AND QUICK COUPLING INCLUDING SUCH AN ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR); Romain Mayer, Hey sur Ugine (FR)

(73) Assignee: STAUBLI FAVERGES, Faverges (FR)

( * ) Notice: Subject to any disclaimer, the term of this patent is extended or adjusted under 35 U.S.C. 154(b) by 45 days.

(21) Appl. No.: 15/366,152

(22) Filed: Dec. 1, 2016

(65) Prior Publication Data
US 2017/0184242 A1 Jun. 29, 2017

(30) Foreign Application Priority Data
Dec. 23, 2015 (FR) ...................... 15 63259

(51) Int. Cl.
F16L 37/34 (2006.01)
F16L 37/32 (2006.01)
(Continued)

(52) U.S. Cl.
CPC ............... F16L 37/32 (2013.01); F16L 37/23 (2013.01); F16L 37/34 (2013.01); F16L 37/35 (2013.01)

(58) Field of Classification Search
CPC . F16L 37/32; F16L 37/23; F16L 37/34; F16L 37/35; Y10T 137/87949
(Continued)

(56) References Cited

U.S. PATENT DOCUMENTS 5,159,955 A 11/1992 Ekman
6,394,131 B1 5/2002 Fross et al.
(Continued)

FOREIGN PATENT DOCUMENTS

DE 20205441 4/2002
DE 20205441 U1 4/2002
(Continued)

OTHER PUBLICATIONS

Search report in related French Application No. 1563259, dated Aug. 3, 2016.

Primary Examiner — Kevin Lee

(57) ABSTRACT

This male or female quick coupling element (4; 6) is intended to be coupled to a pressurized fluid pipe (C4; C6). It comprises a body (42; 62) defining at least one pressurized fluid passage (441, 643, 681), a front face and a longitudinal axis (X4; X6) of the coupling element. An inner part (48; 64) arranged in the body is provided with a surface belonging to the front face, as well as a drain passage (482, 484; 642, 644) coupling the pressurized fluid passage and the outside of the coupling element. An opening mechanism (54, 56, 58, 59; 74, 76, 78, 78) is intended to be actuated from the front face of the coupling element to open the drain passage. The inner part (48; 64) is provided with a peripheral groove (484; 644) in which a seal (59; 79) rests that closes off the drain passage (482, 484; 642, 644) in a closing off portion. The opening mechanism is mounted in the inner part and comprises at least one member (58; 78) for controlling the position of the seal (59; 79) relative to the groove (484; 644), this control member being movable between a first inactive position, where it does not move the seal relative to its closing off position, and a second active position, where it acts directly on the seal (59; 79) to open the drain passage (482, 484; 642, 644).

17 Claims, 13 Drawing Sheets

(51) Int. Cl.
*F16L 37/23* (2006.01)
*F16L 37/35* (2006.01)

(58) Field of Classification Search
USPC .................................... 137/614.03–614.05
See application file for complete search history.

(56) References Cited

U.S. PATENT DOCUMENTS

| | | | | |
|---|---|---|---|---|
| 8,205,914 | B2 * | 6/2012 | Chappaz | F16L 37/23 285/276 |
| 8,256,743 | B2 * | 9/2012 | Tiberghien et al. | F16L 37/0841 137/614.06 |
| 8,616,524 | B2 * | 12/2013 | Tiberghien et al. | F16L 29/007 137/614 |
| 2004/0094739 | A1 * | 5/2004 | Lacroix | F16L 37/0841 251/149.1 |
| 2004/0144436 | A1 | 7/2004 | Zeiber et al. | |

FOREIGN PATENT DOCUMENTS

| | | |
|---|---|---|
| EP | 1353109 | 10/2003 |
| EP | 2669560 | 4/2013 |
| FR | 2657138 | 1/1991 |
| WO | 2014060433 | 4/2014 |

\* cited by examiner

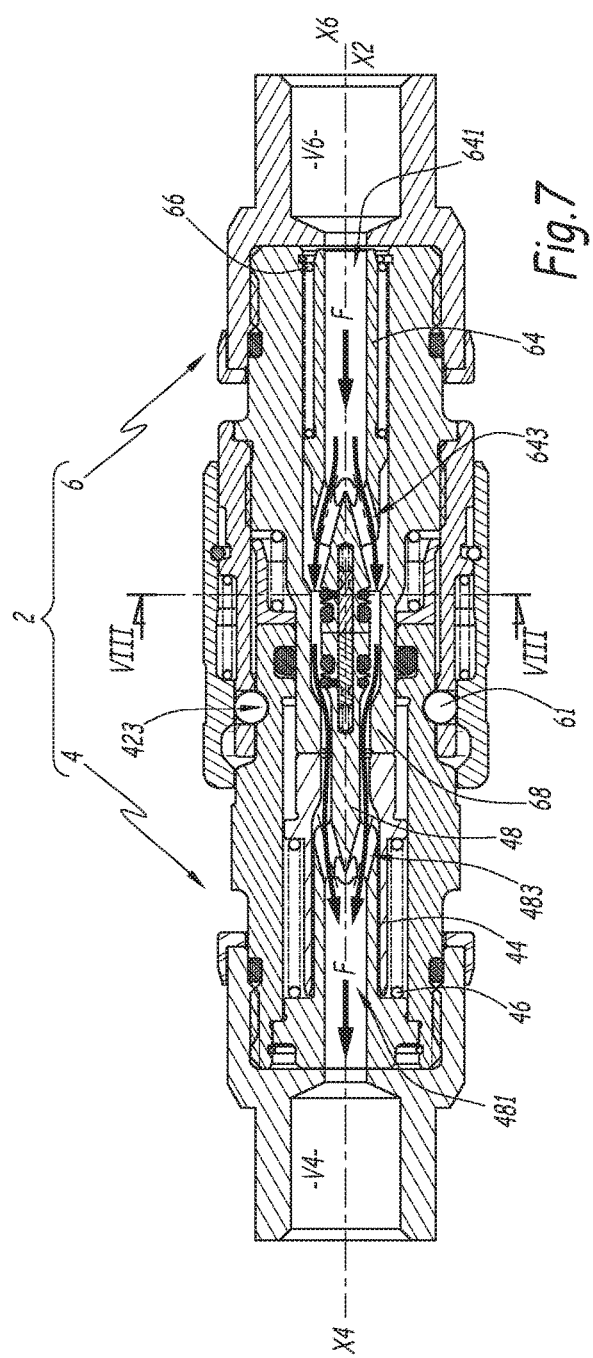
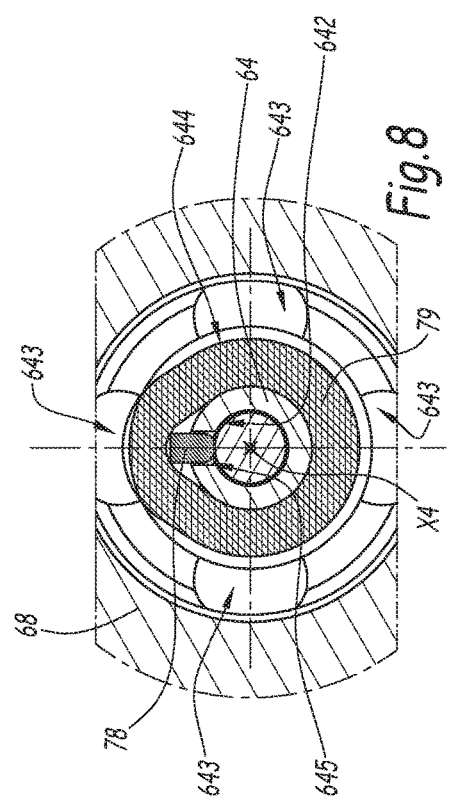

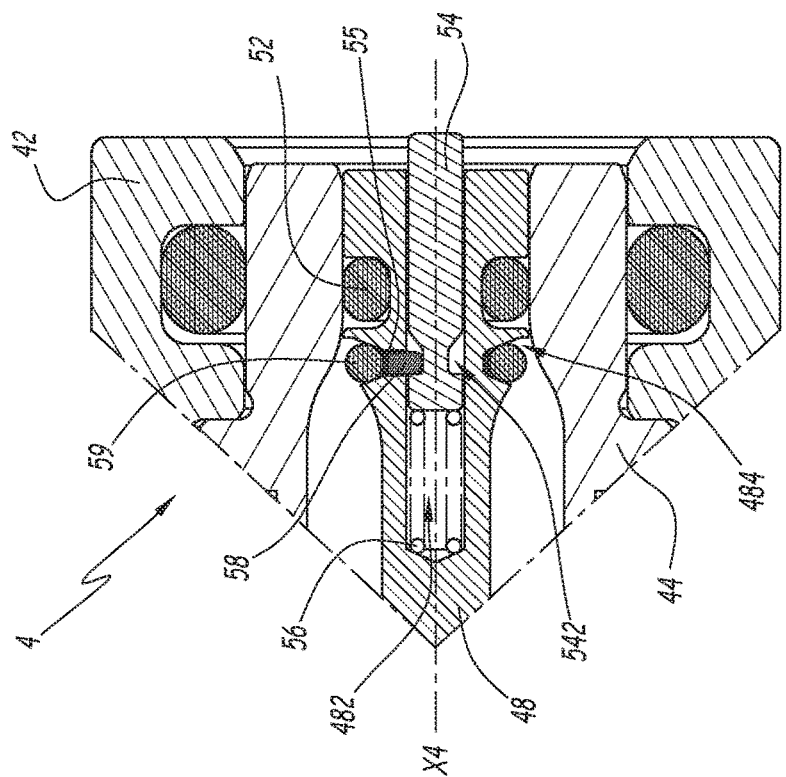
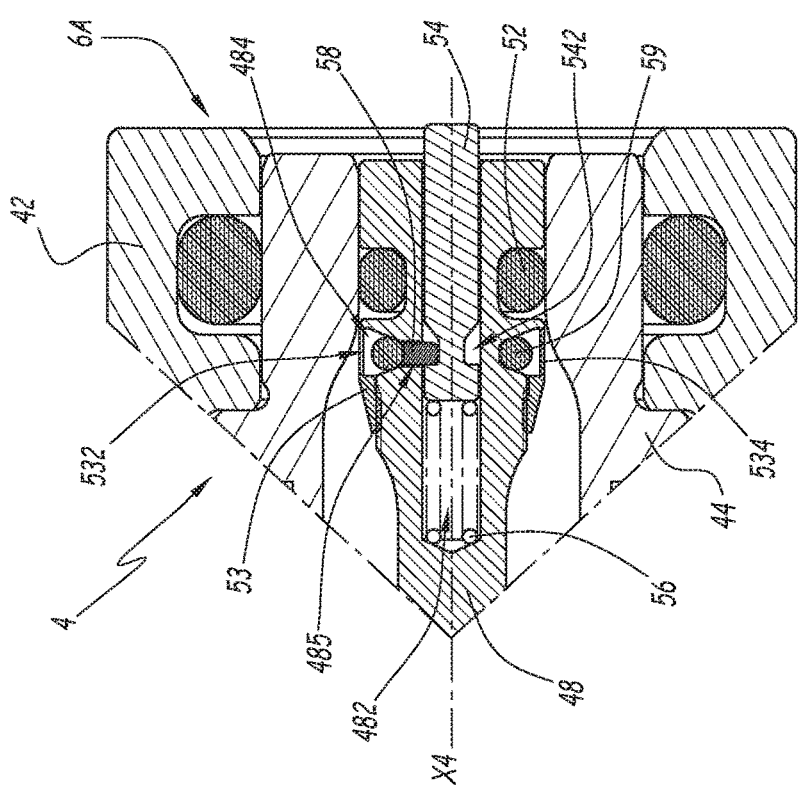

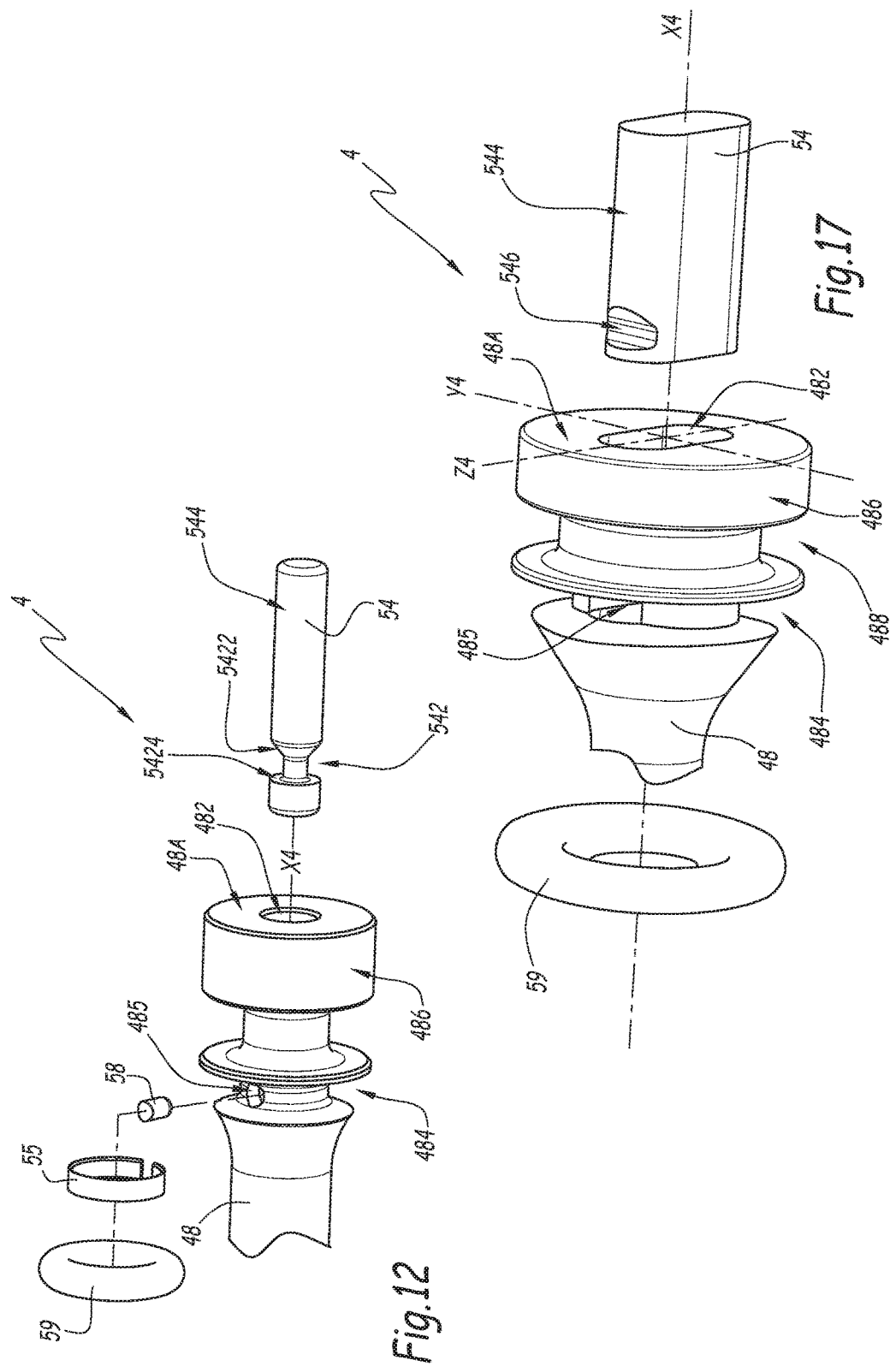

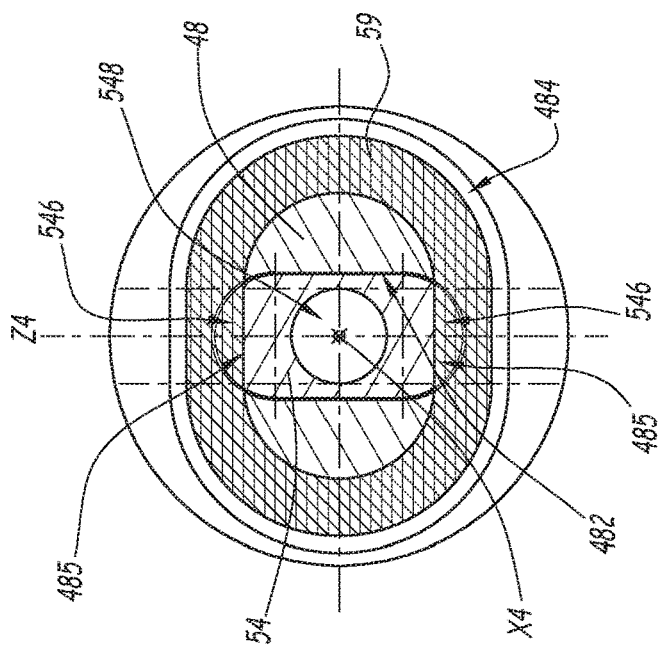
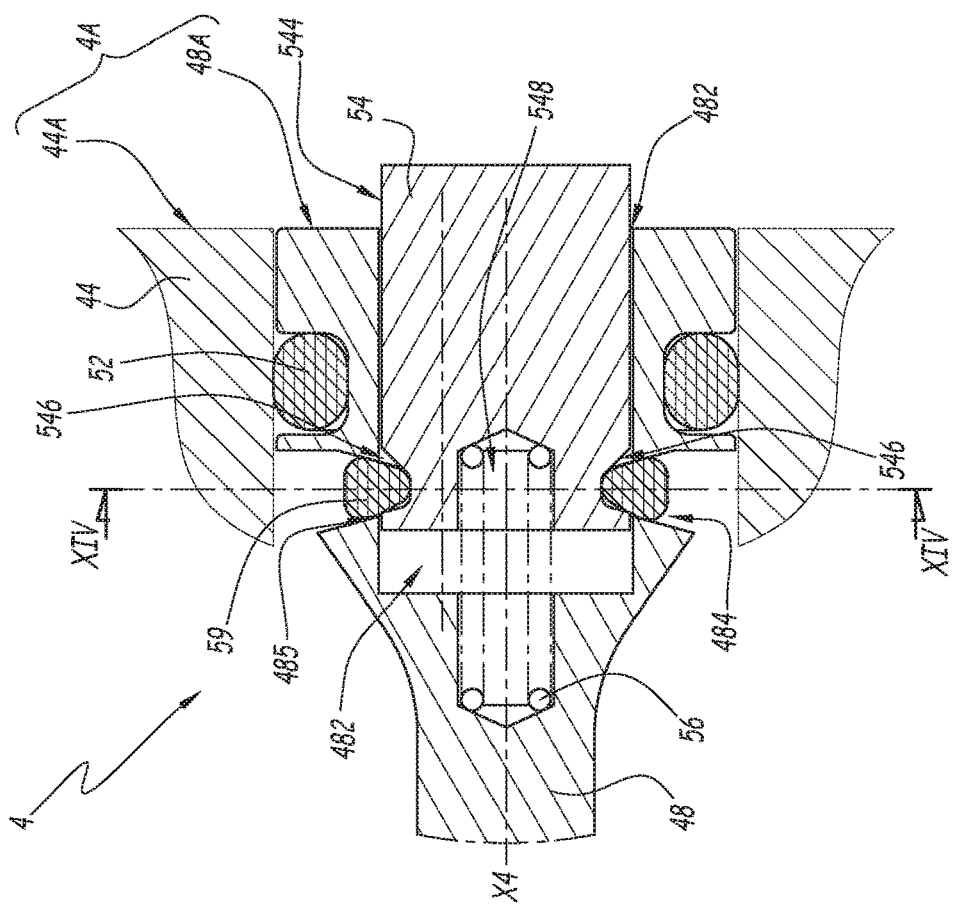

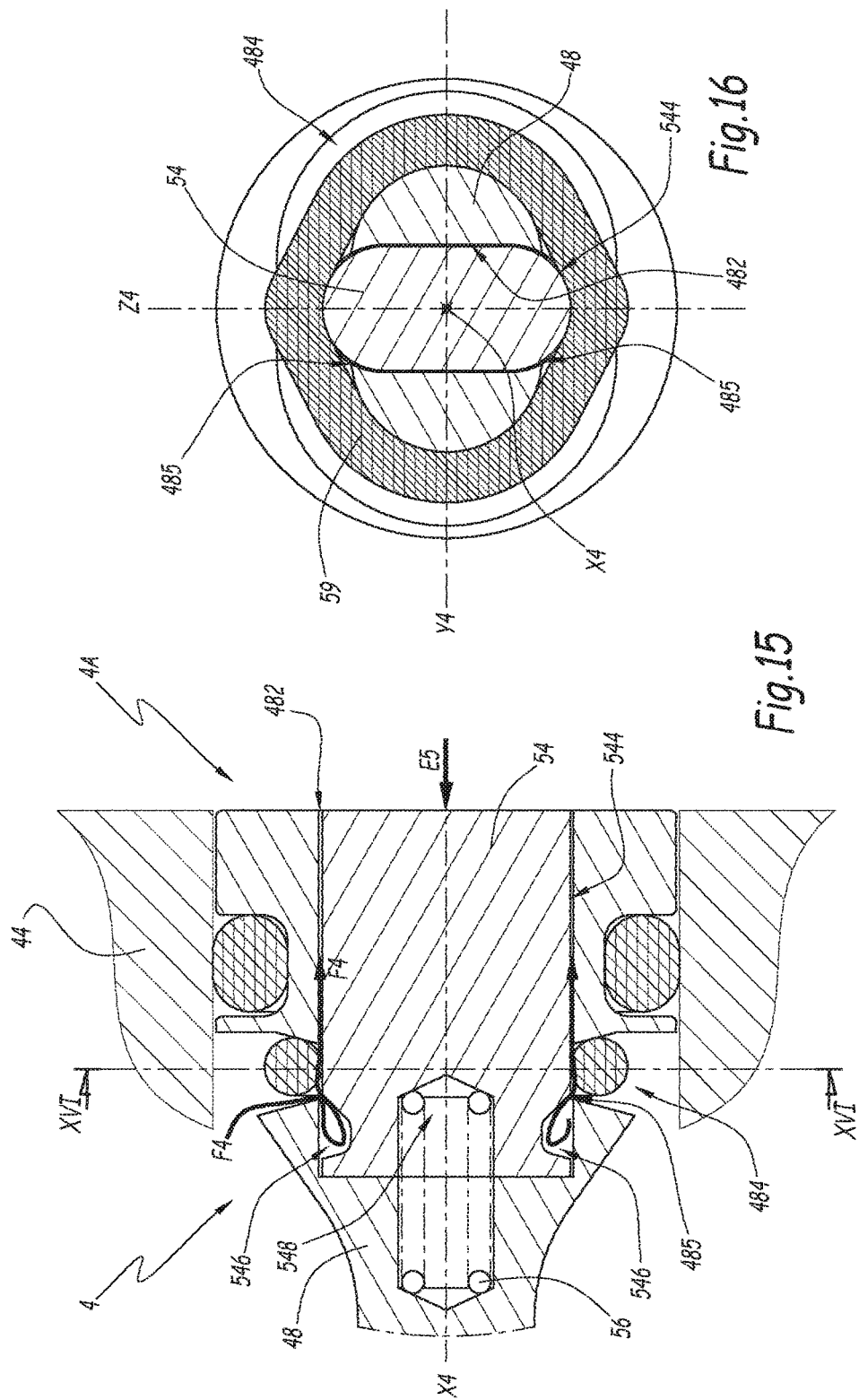

MALE OR FEMALE QUICK COUPLING ELEMENT AND QUICK COUPLING INCLUDING SUCH AN ELEMENT

BACKGROUND OF THE INVENTION

The invention relates to a male or female quick coupling element, as well as a quick coupling including such an element.

The invention more particularly relates to the quick couplers used to couple pressurized fluid pipes. With a quick coupler, when coupling two pressurized fluid pipes, a male element and a female element are nested in one another to create a pressurized fluid circulation tunnel. This coupling requires pushing back valve flaps which, in this case, belong to each of the male and female elements of the coupler. These flaps are subject to the internal pressure of each coupling element, this pressure being able to be high and led to increase in its environment, to the point of hindering the maneuvering of the coupler, inasmuch as the operator may experience difficulties in overcoming the resisting force exerted by the pressure of the fluid inside the coupling elements, against the flaps. For example, for a coupler whereof the flap has an outer diameter of 5 mm, the force to be exerted to connect the male and female elements of the coupler, one of which is coupled to a pipe at 160 bars, is about 330 newton (N).

To overcome this difficulty, it is known, for example from FR-A-2,657,138, to arrange a fluid channel that is opened, during the coupling of the male and female elements of the coupler, owing to a member actuated from the front face of the coupling element. This allows part of the fluid present in the coupler to escape and the pressure of the fluid inside the coupler to be balanced relative to the ambient pressure. This facilitates the withdrawal of the moving valve flaps and makes the operator's manipulations easier.

However, the system of FR-A-2,657,138 is based on the incorporation, within a central part of the coupler, of a non-return flap formed by a bead bearing on a sealing seat. Such as non-return flap is relatively bulky, which is not compatible with all coupler sizes. In particular, in some couplers with a small diameter, only a reduced space is available in the central part of each male or female element, which does not make it possible to accommodate the known mechanism. Furthermore, the larger the diameter of the coupler is, the more the flaps may have extensive surfaces subject to the internal pressure of the coupler and the higher the resisting forces are with respect to the nesting.

The invention more particularly aims to resolve these drawbacks by proposing a new structure for a male or female quick coupling element, in which a fluid passage may be opened during the coupling of the male and female elements of the coupler, without requiring a bulky construction.

BRIEF SUMMARY OF THE INVENTION

To that end, the invention relates to a male or female quick coupling element intended to be coupled to a pressurized fluid pipe and comprising:
- a body defining a pressurized fluid passage, a front face and a longitudinal axis of the coupling element;
- an inner part arranged in the body, which is provided with a surface belonging to the front face, as well as a drain passage coupling the pressurized fluid passage and the outside of the coupling element; and
- an opening mechanism intended to be actuated from the front face of the coupling element to selectively open the drain passage.

According to the invention, the inner part is provided with a peripheral groove in which a seal rests that, in a closing off portion, closes off the drain passage. Furthermore, the opening mechanism is mounted on the inner part and comprises at least one member for controlling the position of the seal relative to the groove, this control member being movable between a first inactive position, where it does not move the seal relative to its closing off position, and a second active position, where it acts directly on the seal to open the drain passage.

Owing to the invention, the activation of the mechanism for opening the fluid channel makes it possible to allow a sufficient quantity of pressurized fluid to escape to lower the residual pressure in the inner volume of the coupling element, to the point that the pressure exerted on its flap can easily be overcome by the operator when nesting the male and female elements in one another. The presence of the seal in the groove of the inner part makes it possible to produce an annular sealing section within the drain passage. The control member makes it possible to create a leak at this seal, when it acts on the seal, in particular to unstick this seal relative to the bottom of the groove against which the seal rests by default, i.e., when it is in its closing off position. Using a peripheral groove and a seal makes it possible to obtain good compactness of the opening mechanism of the drain passage and to use a simple, reliable and cost-effective approach. It requires few structural modifications relative to a traditional coupler. The invention applies indifferently to a male or female coupling element.

According to advantageous, but optional aspects of the invention, such a coupling element may incorporate one or more of the following features, considered in any technically allowable combination:
- The coupling element comprises a plunger that is stationary relative to the body, a flap that is movable relative to the body between a position bearing against a seat defined in part by the plunger and situated on the side of the front face of the coupling element, where it closes off the pressurized fluid passage, and a position separated from the seat, where together with the seat, it defines a pressurized fluid passage section, while the inner part equipped with the peripheral groove and the seal is formed either by the flap or by the plunger.
- The control member is actuated, going from its first inactive position to its second active position, by a piston arranged in a first housing of the inner part, movable in this housing parallel to the longitudinal axis and intended itself to be actuated from the front face.
- The control member is a pin arranged in a second housing of the inner part and radially movable relative to the longitudinal axis, between its first inactive position and its second active position, under the action of a cam surface of the piston.
- The control member is a slotted ring arranged between the seal and the bottom of the groove of the inner part.
- The slotted ring is movable, between its first inactive position and its second active position, under the action of at least one pin arranged in a second housing of the inner part and which itself is radially movable relative to the longitudinal axis, between a first inactive position and a second active position, under the action of a cam surface of the piston.

The control member is a piston arranged in a first housing of the inner part, movable in this housing and intended itself to be actuated from the front face.

The piston is movable parallel to the longitudinal axis and defines at least one partial release space of the seal, in the inactive position of the piston.

The coupling element comprises means for elastically stressing the piston toward a position where the latter does not actuate the moving member and where it can be actuated from the front face.

The drain passage comprises at least the first housing of the inner part.

The peripheral groove of the inner part has a trapezoidal, semicircular or asymmetrical section.

The coupling element comprises a member for retaining the seal in the peripheral groove, in particular a ring secured to the inner part.

The drain passage emerges on the front face of the coupling element.

The control member is movable in the drain passage.

Furthermore, the invention relates to a quick coupler for removably joining pressurized fluid pipes, this coupler comprising a male element and female element, at least one of which is as mentioned above.

BRIEF DESCRIPTION OF THE SEVERAL VIEWS OF THE DRAWINGS

The invention will be better understood and other advantages thereof will appear more clearly in light of the following description of six embodiments of a coupling element and a coupler according to its principle, provided solely as an example and done in reference to the appended drawings, in which:

FIG. 7 is a sectional view similar to FIG. 1, when the coupling elements are coupled;

FIG. 8 is an enlarged partial sectional view along line VIII-VIII in FIG. 7,

FIG. 10 is a partial sectional view similar to FIG. 2 for a coupling element according to a third embodiment of the invention;

FIG. 11 is a partial sectional view similar to FIG. 2 for a coupling element according to a fourth embodiment of the invention;

FIG. 12 is a partial perspective view of the coupling element shown in FIG. 11;

FIG. 13 is a partial sectional view approximately corresponding to FIG. 2 for a coupling element according to a fifth embodiment of the invention, in the uncoupled configuration;

FIG. 14 is a partial sectional view along line XIV-XIV in FIG. 13;

FIG. 15 is a partial sectional view similar to FIG. 15, when the coupling element is bearing on a complementary coupling element that is not shown;

FIG. 16 is a partial sectional view along line XVI-XVI in FIG. 15;

FIG. 17 is a partial perspective view of the coupling element shown in FIGS. 13 to 16.

DETAILED DESCRIPTION OF THE INVENTION

Figure 1:
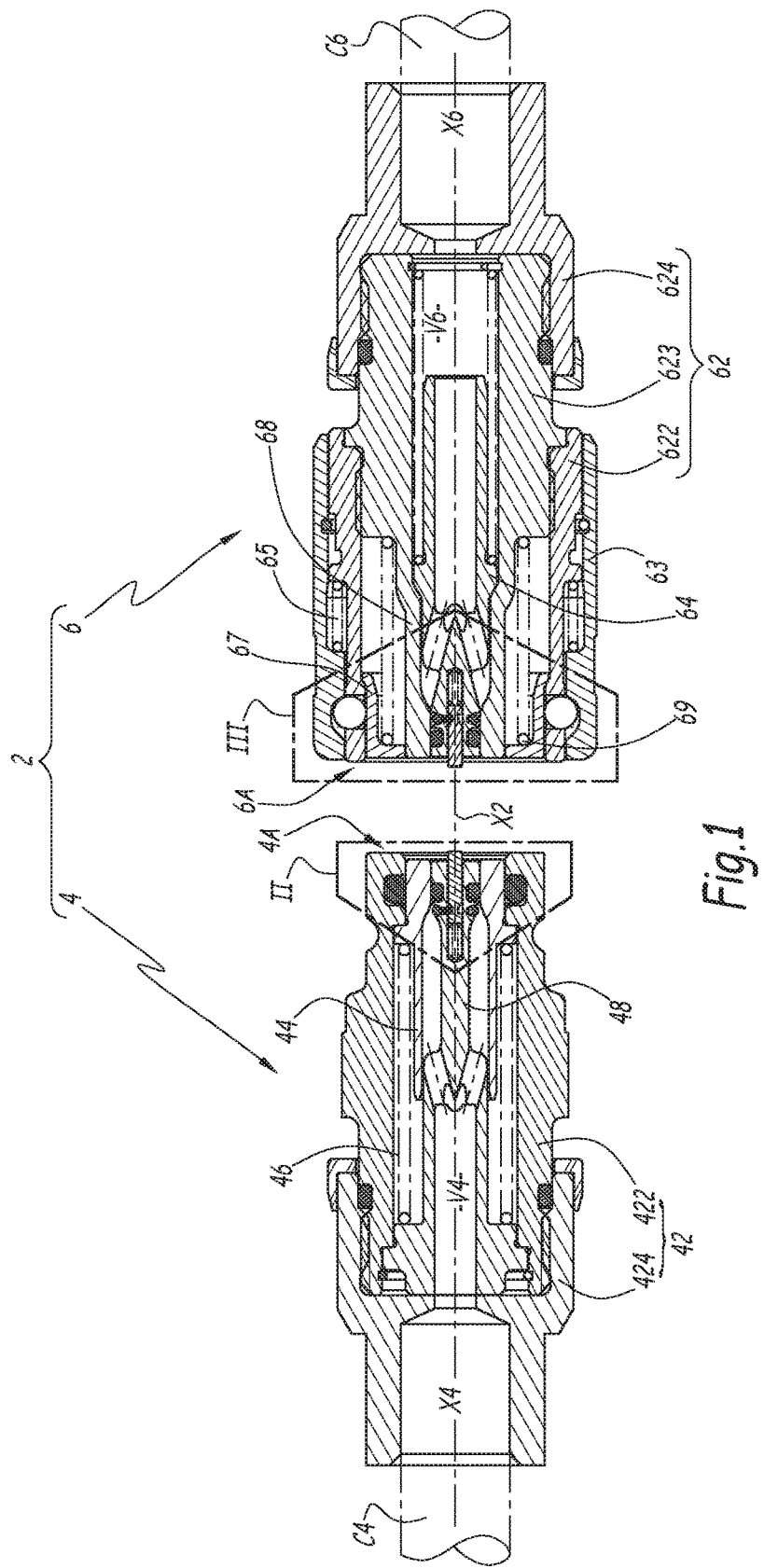
FIG. 1 is an axial sectional view of the male and female elements of the quick coupler according to the invention, these male and female elements themselves being according to the invention and shown in the uncoupled configuration.

The coupler 2 shown in FIGS. 1 to 8 comprises a male element 4 and a complementary female element 6, each aligned on a longitudinal axis X4, X6, respectively.

During operation, the axes X4 and X6 are aligned on a shared axis X2 that constitutes the longitudinal axis of the coupler 2. During operation, the elements 4 and 6 are each coupled to a pressurized fluid pipe C4, C6, respectively. For the clarity of the drawing, these pipes C4 and C6 are shown only in mixed lines in FIG. 1.

The male element 4 comprises a body 42 that defines the axis X4 and that is formed by two parts 422 and 424 screwed into one another. Inside the body 42, a flap 44 is arranged that is elastically stressed by a spring 46 toward the front face 4A of the male element 4.

The front face of a coupling element is the face of this element turned toward the complementary element during the coupling of the male and female elements of the coupler. The front faces may comprise all of the front faces of the parts turned toward the complementary element that are or are not contained in the same plane. The front face of a coupler is opposite the pipe at the end of which the coupler is mounted. The front face of a male or female coupler is therefore provided for the cooperation of the coupling element with a corresponding female or male coupling element.

Inside the body 42, a plunger 48 is also arranged that is stationary relative to the body 42 and surrounded by the flap 46. The plunger 48 therefore forms an inner part for the male coupling element 6.

The body 42 defines an annular front surface 42A, perpendicular to the axis X4 and that belongs to the front face 4A. Likewise, the flap 44 defines an annular front surface 44A, perpendicular to the axis X4 and that belongs to the front face 4A, while the plunger 48 defines an annular front surface 48A, perpendicular to the axis X4 and that belongs to the front face 4A. The surfaces 42A, 44A and 48A are concentric, the surface 42A surrounding the surfaces 44A and 48A, while the surface 44A surrounds the surface 48A.

Figure 2:
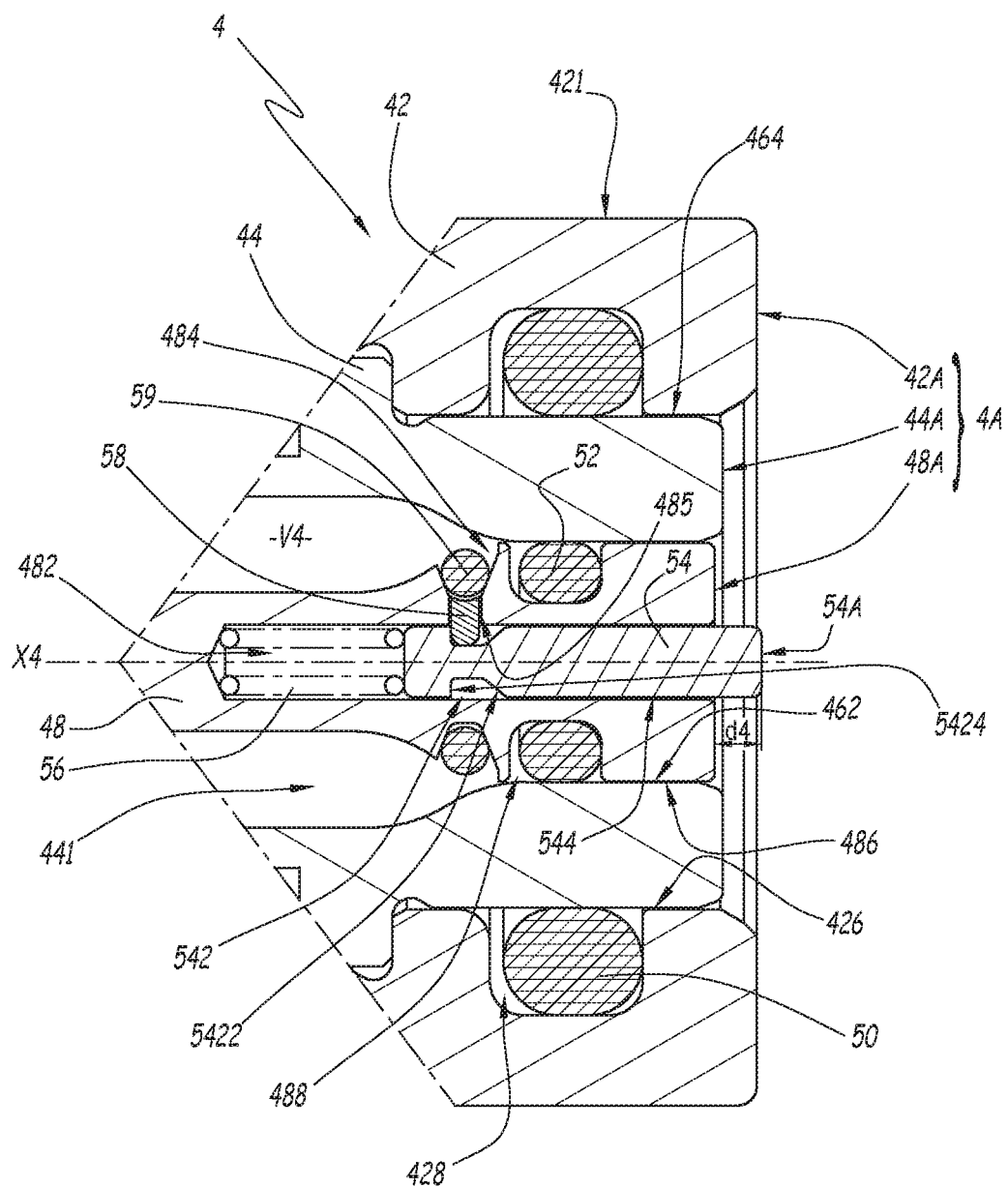
FIG. 2 is an enlarged view of detail II in FIG. 1.

In the closed configuration of the coupling element 4, shown in FIGS. 1 and 2, the flap 46 is bearing on two seats respectively formed by the inner radial surface 426 of the body 42 and the outer radial surface 486 of the plunger 48 situated on the side of the front face 4A of the male coupling element 4. The surfaces 426 and 486 are each provided with a groove 428, 488, respectively, in which an O-ring 50, 52 is respectively arranged. In the closed configuration of the coupling element 4, the O-rings 50 and 52 are respectively bearing on the outer radial surface 462 and against the inner radial surface 464 of the flap 46. This ensures sealing upon closure of the coupling element 4. The inner volume V4 of the coupling element 4 is then isolated from the outside.

Furthermore, a piston 54 is arranged in a central housing 482 of the plunger 48, this housing 482 being aligned on the axis X4 and emerging on the front surface 48A. Reference 54A denotes the front face of the piston 54, which is arranged at the center of the front face 4A. The piston 54 is provided with a peripheral groove 542 having an asymmetrical section. On the side of the front face 4A, the groove 542 is flared and defined by a surface 5422 that diverges from the axis X4 while coming closer to the surface 48A. In other words, the surface 5422 is frustoconical, centered on the axis X4 and converges opposite the front face 4A. On the side opposite this front face 4A, the groove 542 is defined by a surface 5424 that is annular and perpendicular to the axis X4.

A spring 56 is arranged between the piston 54 and the bottom of the housing 482, while being compressed by the piston 54 that it elastically pushes back toward the front face 4A. The housing 482 is a blind piercing centered on the axis X4 and that emerges at the center of the surface 48A. The housing 482 constitutes a first housing arranged in the plunger 48 and belongs to a drain passage of the male coupling element 4, defined below.

A pin 58 is engaged in the groove 542 and constitutes a stop means that opposes the ejection of the piston 54 outside the housing 482 by the spring 56.

Furthermore, the plunger 48 is provided with a peripheral groove 484 in which an elastomer O-ring 59 is arranged, the diameter of which is selected so that it rests by default against the bottom of the groove 484. A piercing 485 couples the bottom of the groove 484 and the housing 482. The pin 58 is arranged in this piercing 485. In other words, the piercing 485 constitutes a housing for receiving the pin 58, which protrudes radially toward the axis X4 in the housing 482. This piercing 485 constitutes a second housing arranged in the plunger 48 and also belongs to the drain passage of the male coupling element 4. In the configuration of FIGS. 1 and 2, the seal 59 exerts a centripetal force on the pin 58 and rests against the bottom of the groove 484, such that it opposes the flow of the pressurized fluid toward the outside of the coupling element 4.

The female coupling element 6 comprises a body 62 that is formed by three parts 622, 623 and 624 screwed on one another, i.e., a front part 622, an intermediate part 623 and a rear part 624. A flap 64 is mounted movably inside the body 62 while being stressed toward the front face 6A of the element 6 by a spring 66. The flap 64 therefore forms an inner part for the female coupling element 6. A plunger 68 radially surrounds the flap 64 and its inner radial surface 686 defines a seat, on the side of the front face 6A of the female coupling element 6 intended to cooperate with the flap 64. In the example, the plunger 68 forms a single piece with the intermediate part 623 of the body 62. Other configurations can be considered.

An auxiliary sealing member 67 is installed radially between the front part 622 of the body 62 and the plunger 68. This auxiliary sealing member 67 is subject to the action of a spring 69 that pushes it toward the front face 6A of the coupling element 6. This makes it possible to keep a series of beads 61, serving to lock the elements 4 and 6 in the coupled configuration, in orifices 625 of the body 62.

Furthermore, a ring 63 is mounted axially movably around the body 62, while being subject to the action of a return spring 65 that pushes it toward the front face 6A. The ring 63 makes it possible to control the movement of the beads 61, in a manner known in itself.

The elements 63, 62, 67, 68 and 64 are each provided with an annular surface 63A, 62A, 67A, 68A and 64A, perpendicular to the axis X6 and that defines a part of the front face 6A of the coupling element 6.

The flap 64 is provided with a housing arranged in the form of a blind central piercing 642 centered on the axis X6 and that emerges on the surface 64A. This piercing constitutes a first housing arranged in the flap 64 and belongs to a drain passage of the female coupling element, defined below. A piston 74 is mounted sliding in this housing 642 and subject to an elastic force exerted by a spring 76. Reference 74A denotes the front face of the piston 74, which is arranged at the center of the front face 6A. A pin 78 is engaged in a peripheral groove 742 of the piston 74, which is bordered by a flared frustoconical surface 7422 and that diverges toward the front faces 6A and by a surface 7424 perpendicular to the axis X6.

The pin 78 traverses a piercing 645 that emerges in a groove 644 arranged around the flap 64 and in which an O-ring 79 is installed. The piercing 645 constitutes a second housing arranged in the flap 64 and also belongs to the drain passage of the female coupling element 6. The seal 79 rests by default against the bottom of the groove 644, such that it opposes the flow of the pressurized fluid toward the outside of the coupling element 6.

In a plane perpendicular to the axis X4, respectively to the axis X6, the grooves 484 and 644 are circular.

The parts 74, 76, 78 and 79 are identical to the parts 54, 56, 58 and 59. However, this is not mandatory.

The outer peripheral surface 646 of the flap 64 is equipped with a groove 648 in which an O-ring 72 is arranged that sees to the sealing of the female coupling element 6 in the closed off configuration, at the interface between the flap 64 and the plunger 68. This isolates the inner volume V6 of the coupling element 6 from the outside.

Figure 3:
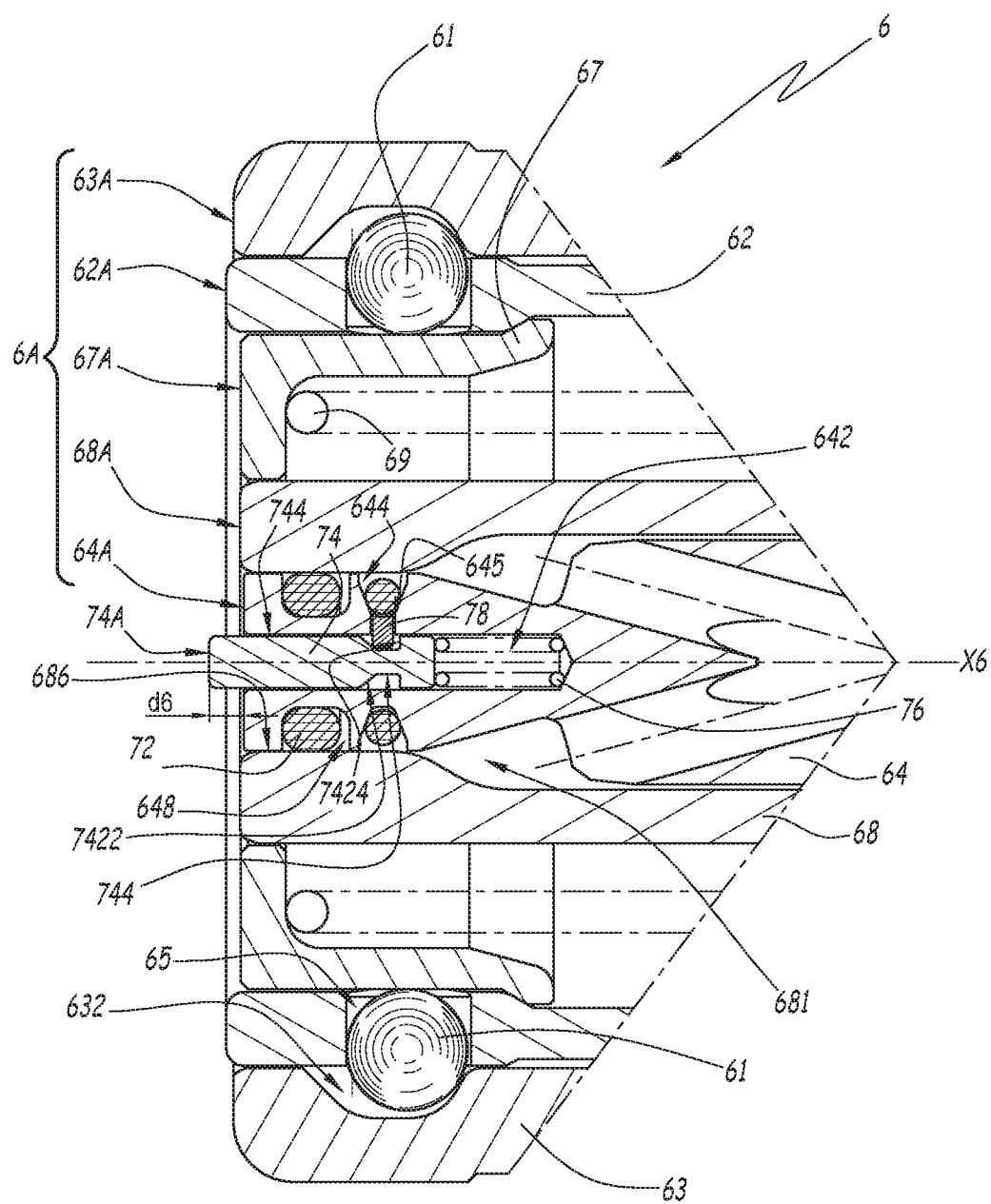
FIG. 3 is an enlarged view of detail III in FIG. 1.

In the configuration of FIGS. 1 and 3, the pistons 54 and 74 each protrude from the corresponding front face 4A or 6A over an axial distance d4, d6, respectively, measured parallel to the axis X4 or X6 and which is not zero. Thus, the pistons 54 and 74 can be actuated by an operator, each from the front faces 4A or 6A of the coupling element 4 or 6 to which they belong, by exerting, using a shared tool or the complementary element 6 or 4, respectively, a force on them having at least one axial component oriented toward the rear of the coupling element.

In the example of the figures, the distances d4 and d6 are identical. This is not mandatory.

Figure 4:
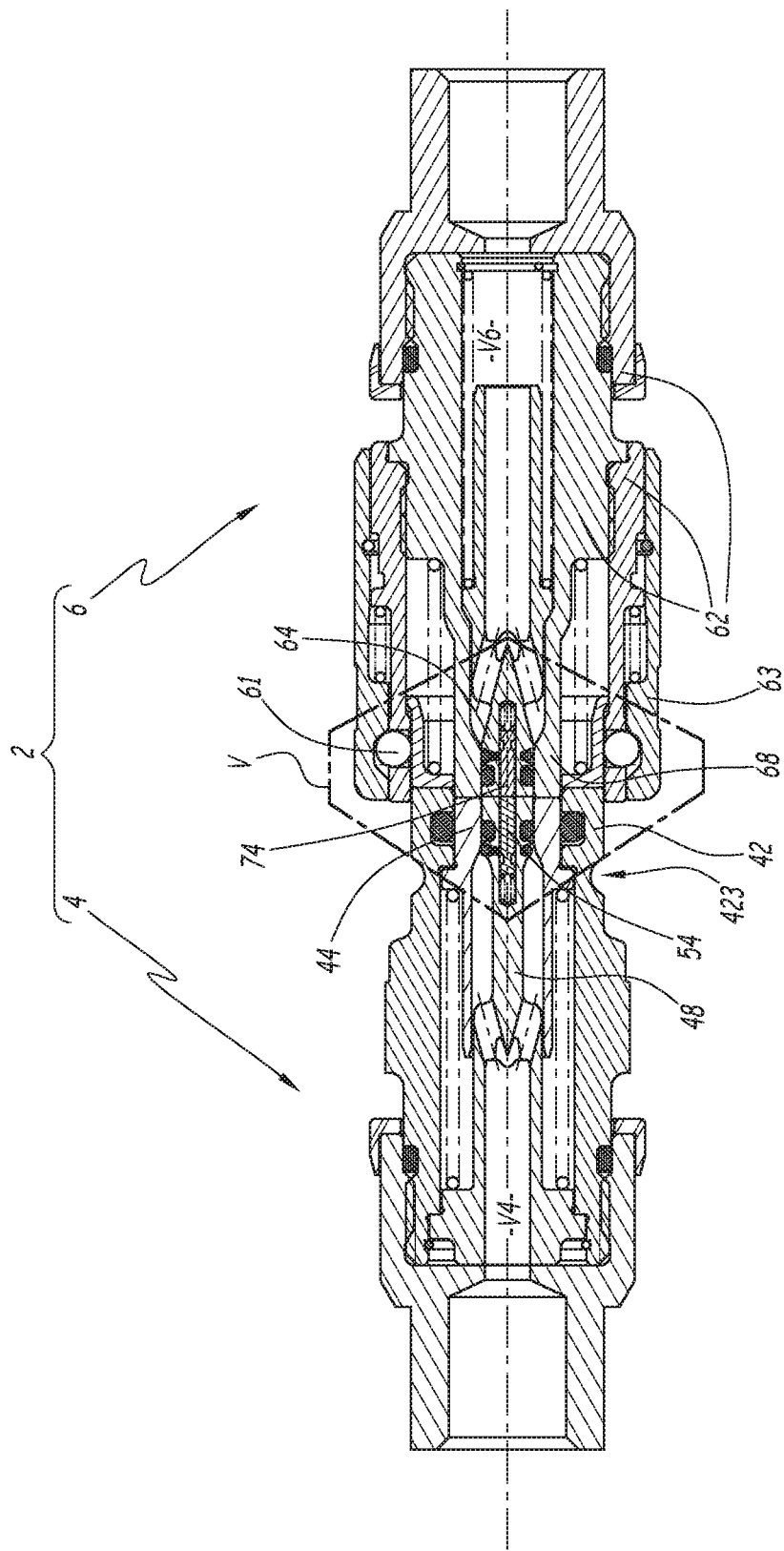
FIG. 4 is a sectional view similar to FIG. 1, when the male and female elements of the coupler are in the early coupling phase.
Figure 5:
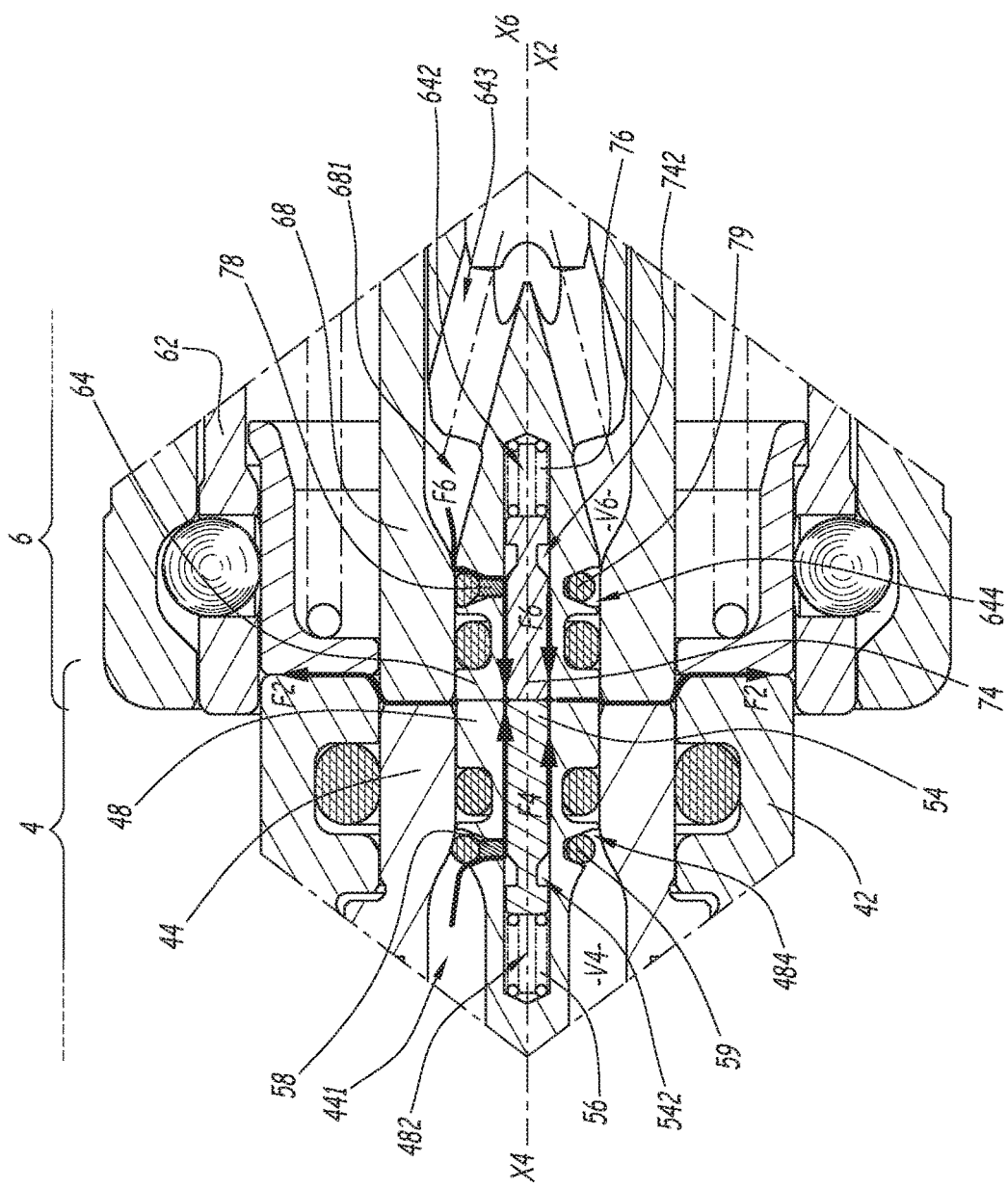
FIG. 5 is a larger scale view of detail V in FIG. 4.

When the front faces 4A and 6A of the male and female elements 4 and 6 are brought into contact with one another, as shown in FIGS. 4 and 5, the pistons 54 and 74 are pushed back toward the inside of the housing 482 and 642, respectively against the elastic forces exerted by the springs 56 and 76, toward the bottom of the housings 482 and 642. This withdrawal movement of the pistons results in axially moving the grooves 484 and 644 opposite the front faces 4A and 6A, i.e., toward the bottom of the housings 482 and 642, which moves the frustoconical surfaces 5422 and 7422 into contact with the pins 58 and 78, which are then pushed radially back toward the outside, i.e., moving away from the axis X2, which is then combined with the axes X4 and X6. The pins 58 and 78 are thus ejected from the grooves 542 and 742 and respectively bear against the outer radial surfaces 544 and 744 of the pistons 54 and 74, between these grooves and the front faces 54A and 74A of the pistons 54 and 74. The axial position of the pins 58 and 78 relative to the front faces 4A and 6A remains unchanged during their centrifugal radial movement relative to the axis X2.

The surfaces 5422 and 7422 of the pistons each represent a cam surface along the axis X4 and X6. The action of the cam surfaces 5422 and 7422 of the pistons 54 and 74 on the pins 58 and 78 causes their centrifugal radial movement relative to the axis X2, which produces a direct action on the seal 59 or 79. This centrifugal movement of the pins 58 and 78 results in unsticking the O-rings 59 and 79 relative to the bottoms of the grooves 484 and 644.

In the coupling element 4, this creates a leak around the pin 58, through the piercing 485. More specifically, pressurized fluid that is located in the inner volume V4 of the male coupling element 4, in particular between the plunger 48 and the flap 44, can flow into the groove 484, into the piercing 485, and from there, into the housing 482 around the piston 54 and up to the front face 4A, as shown by the arrows F4.

Likewise, inside the coupling element 6, fluid present in the inner volume V6, in particular between the flap 64 and the plunger 68, can flow into the groove 644, around the pin 78 within the piercing 645 and, from there, to the inside of the housing 642 around the pin 74 and up to the front face 6A, as shown by the arrows F6.

These two flows then emerge at the interface between the two coupling elements 4 and 6, between the front faces 4A and 6A, from which they flow toward the outside of the coupler 2, as shown in by the arrows F2.

In other words, a drain passage is created in the coupling element 4, by the joining of the volumes of the groove 484, the piercing 485 and the housing 482. This drain passage couples the inner volume V4 to the front face 4A. It is closed off by the seal 59 in the configuration of FIGS. 1 and 2. In the configuration of FIGS. 4 and 5, it is opened by the pin 58, which acts directly on the seal 59 to unstick it from the bottom of the groove 484. Here, "directly" means that the pin 58 is in contact with the seal 59 and exerts a mechanical force on the latter without the insertion of an intermediate part.

Likewise, a drain passage is created in the female coupling element 6, by the joining of the volumes of the groove 644, the piercing 645 and the housing 642. This drain passage couples the inner volume V6 to the front face 6A. It is closed by the seal 79 in the configuration of FIGS. 1 and 3. It is opened owing to the action of the pin 79 in the configuration of FIGS. 4 and 5. Here again, the pin 78 acts directly on the seal 79.

Figure 6:
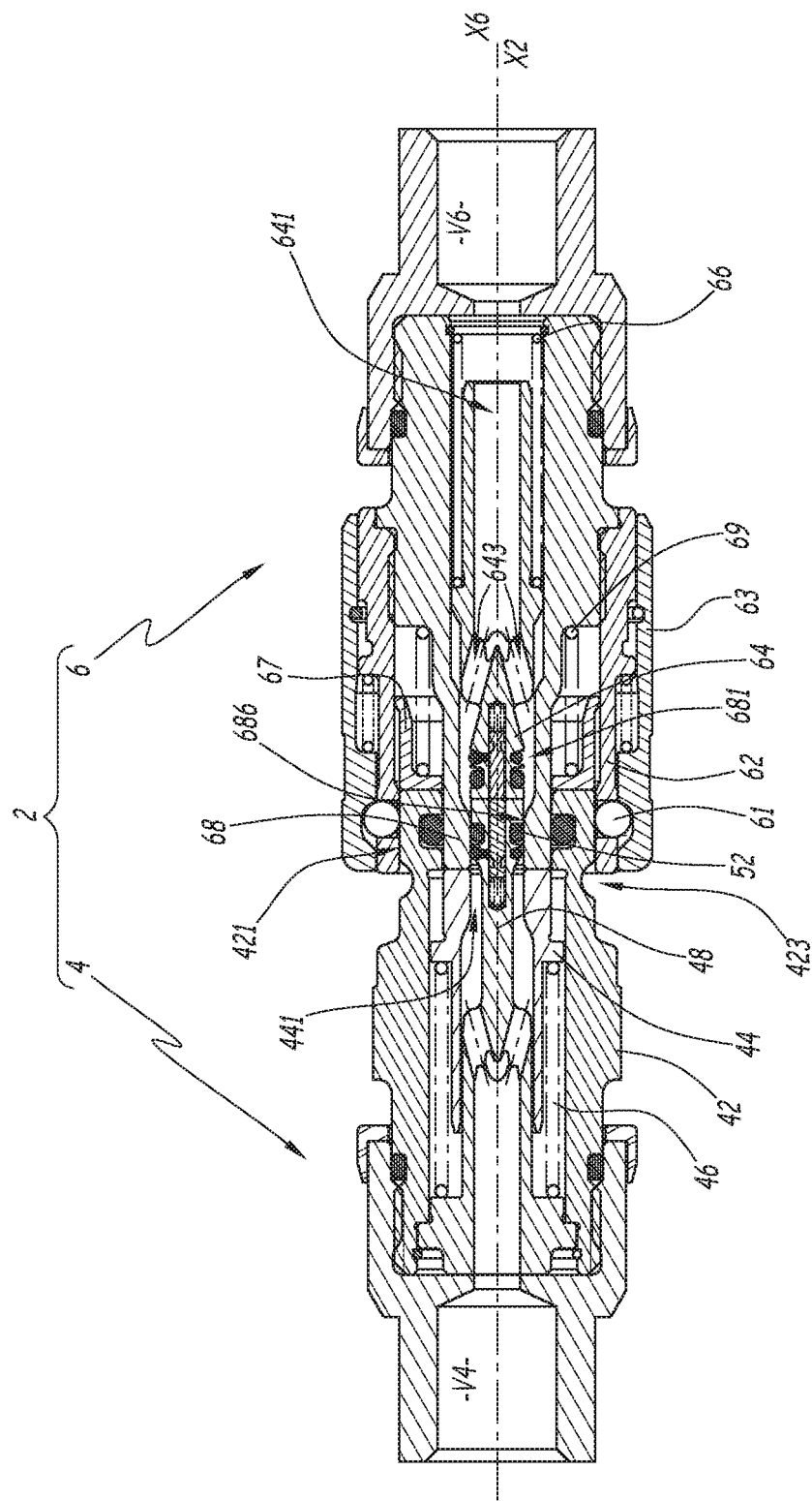
FIG. 6 is a sectional view similar to FIG. 1, during a subsequent phase of the coupling of the coupling elements.

The continued nesting of the male 4 and female 6 elements in one another makes it possible to reach the configuration of FIG. 6, where the plunger 48 has separated the flap 64 from the seat formed by the inner radial surface 686 of the plunger 68 by pushing back against the elastic force exerted by the spring 66, while the plunger 68 has pushed the flap 44 back against the elastic force exerted by the spring 46. The fluid communication between the respective inner volumes V4 and V6 of the coupling elements 4 and 6 is not yet established, inasmuch as the O-ring 52 is bearing against the inner radial surface of the plunger 68. In this configuration, the body 42 has also pushed the auxiliary sealing member 67 back toward the inside of the body 62, against the elastic force exerted by the spring 69. The beads 61 are then bearing against the outer radial surface 421 of the body 42.

The beads 61 remain engaged in an inner radial groove 632 of the ring 63, as in the configuration of FIGS. 1 to 5.

The continued nesting movement makes it possible to reach the coupled configuration of FIGS. 7 and 8.

In this configuration, the front part of the plunger 48, which is equipped with grooves 484 and 488, has protruded past the front part of the plunger 68, which has the smallest inner diameter, such that the O-ring 52 is no longer in contact with the inner radial surface 686 of the plunger 68. This occurs by pushing the flap 64 further against the elastic force exerted by the spring 66, on the one hand, and by pushing the flap 44 against the elastic force exerted by the spring 46, on the other hand.

This makes it possible to create a fluid communication between the respective inner volumes V4 and V6 of the elements 4 and 6 of the coupler through the passage section formed between the plunger 68 and the flap 64, and through the passage section formed between the plunger 48 and the flap 44. In the example of the figures, it has been considered that the female coupling element 6 is coupled to a pressurized fluid source, while the male coupling element 4 is coupled to a load that consumes this fluid, such that the flow of pressurized fluid takes place from right to left in FIG. 7, as shown by the arrows F. These arrows show that the inner volume of each coupling element 4 or 6 defines a pressurized fluid passage. In the coupling element 4, the pressurized fluid passage comprises a central bore 481 of the plunger 48, channels 483 arranged in this plunger and that diverge toward the face 4A and a central bore 441 of the flap 44. In the coupling element 6, the pressurized fluid passage comprises a central bore 641 of the flap 64, channels 643 that diverge toward the front face 6A and a central bore 681 of the plunger 68.

In the configuration of FIGS. 7 and 8, the beads 61 are engaged in an outer peripheral groove 423 of the body 42, which locks the coupling elements 4 and 6 together.

When going from the configuration of FIGS. 4 and 5 to that of FIGS. 6, then 7 and 8, the pistons 54 and 74 remain immobile in the housing 482 and 642. Thus, the pins 58 and 78 remain ejected from the peripheral grooves 542 and 742 of the pistons 54 and 74, and keep the seals 59 and 79 locally separated from the bottoms of the grooves 484 and 644. The drain passages therefore remain open. FIG. 8 therefore shows the position of the pin 78 and the seal 79 in the configurations of FIGS. 4 to 7.

In the configuration of FIGS. 4 and 5, the pressure exerted by the spring 56 on the piston 54 is about 1.5 N, while the force exerted by the pin 58 to separate the seal 59 from the bottom of the groove 484 is about 7 N. The force necessary to actuate the opening mechanism to lower the residual pressure of the coupler is therefore significantly lower than the nesting force to be exerted in a coupler of the prior art, which is about 330 N, as mentioned above.

Figure 9:
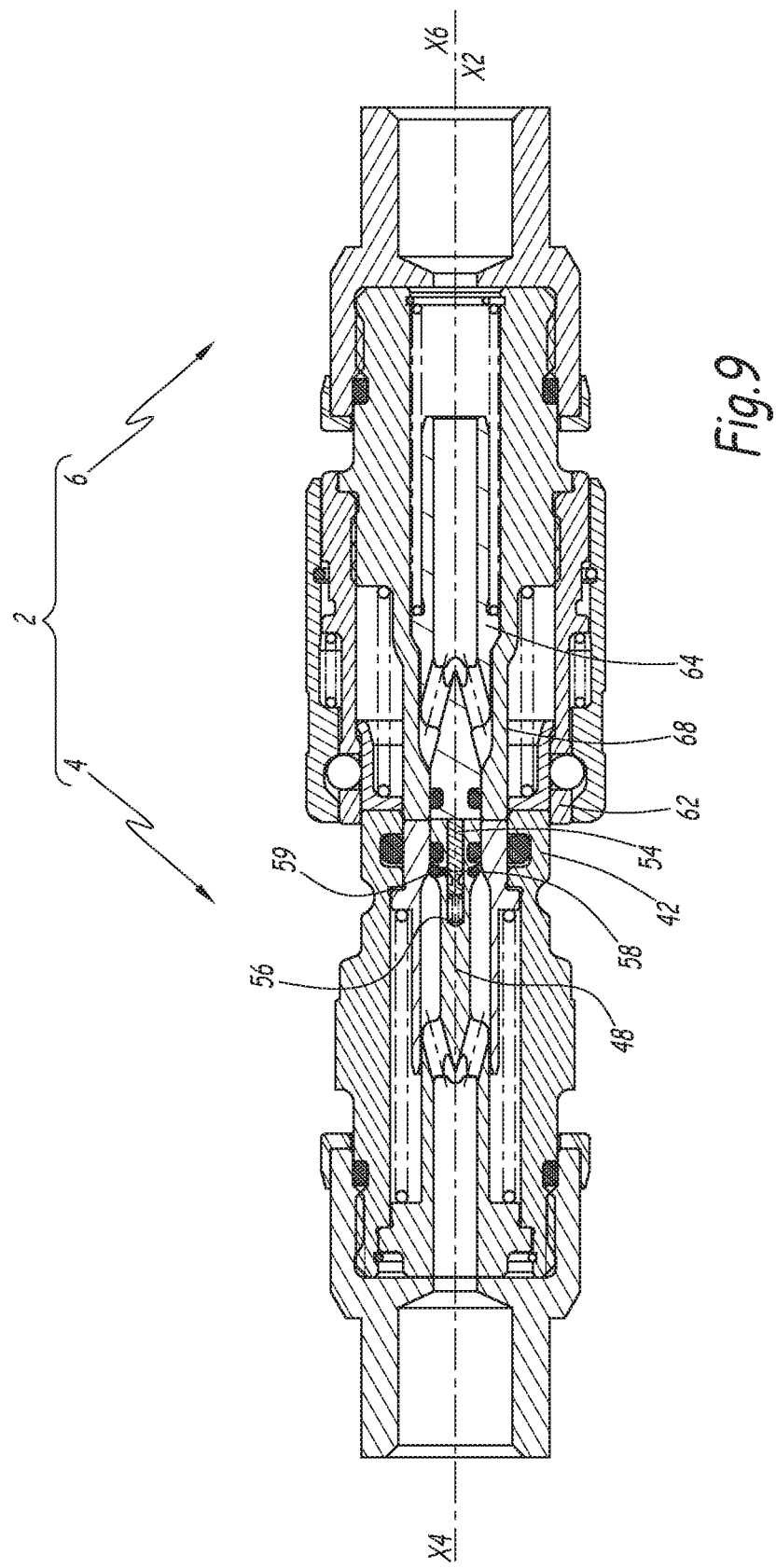
FIG. 9 is a sectional view similar to FIG. 4 for a coupler according to a second embodiment of the invention, which is in an intermediate configuration between those of FIGS. 4 and 6.

In the second to sixth embodiments shown in FIG. 9 and following, the elements similar to those of the first embodiment bear the same references. Hereinafter, we only describe what distinguishes these other embodiments from the first embodiment.

In the second embodiment shown in FIG. 9, only the male coupling element 4 is equipped with a mechanism for opening a drain passage, which comprises a piston 54, a spring 56, a pin 58 and a seal 59. The female element 6 of the coupler is a traditional element equipped with a central flap whereof the front face is aligned with the front face of the female element in the uncoupled position of the coupler, and able to push the piston 54 of the male element 4 back during the coupling phase.

The coupler 2 of this embodiment is adapted to the case with female element 6 of the coupler is connected to a pressurized fluid source, while the male element 4 is coupled to the inner pipes of an apparatus whereof the internal pressure can be made to increase in the uncoupled position of the elements, and the flap 44 contains an internal pressure great enough to hinder the coupling maneuver. The fluid flows from right to left in FIG. 9.

The invention is compatible with different piston 54 envelopes and lengths such that, in the uncoupled position of the coupler, the front face 54A of the piston 54 can be axially withdrawn relative to the front face 4A of the coupling element and the piston no longer emerges from the front face 44A of the flap 44, while the control member is in an inactive position. The front face of the complementary female element 6 is then suitable for having a protruding shape able to push the piston further back in its central housing 482 in the coupling phase, in order to actuate the opening mechanism of the male element.

According to one alternative of the invention that is not shown, a reverse configuration is implemented. In other words, the female element 6 is equipped with a mechanism for opening a drain passage formed by a piston, a spring, a pin and a seal, as explained above for the first embodiment, while the male element does not have these. This alternative is adapted to the case where only the male coupling element is supplied with pressurized fluid during the coupling of these elements.

In the third embodiment shown in FIG. 10, a cage 53 is attached on the plunger 48 to prevent the seal 59 from leaving the groove 484 when it is pushed back by the pin 58. In the example, this cage 53 is screwed on the plunger 48. Alternatively, it can be mounted on this plunger by other means, in particular by gluing or snapping.

The cage 53 is provided with several apertures 532 distributed around the axis X4, one of which is visible in the top part of FIG. 10, and which allow fluid to pass toward the groove 484. These apertures are therefore part of the drain passage. Between the apertures 532, and as shown in the bottom part of FIG. 10, a web 534 of the ring 53 closes off the groove 484, which keeps the seal 59 inside the groove 484.

Alternatively, other means for retaining the seal 59 in the groove 484 can be provided, such as elements forming a single piece with the plunger 48.

In the embodiment of FIGS. 11 and 12, a slotted ring 55 is inserted between the pin 58 and the seal 59. This slotted ring is flat, in that it has a cross-section, visible in FIG. 11, that is wider along a direction parallel to the axis X4 than along a direction perpendicular to the axis. The slotted ring 55 makes it possible to distribute the thrust exerted by the pin 58 when it is moved, radially to the axis X4, by the piston 54, over a zone of the seal 59 that corresponds to an annular sector that is wider than only the interaction zone between the pin 58 and the seal 59 in the first and third embodiments. Furthermore, since the slotted ring 55 circumnavigates almost the entire circumference of the plunger 58, near the bottom of the groove 484, it is elastically deformed when the pin 58 is pushed radially outward by the piston 54. Since the slotted ring 55 tends to regain its initial shape, it tends to push the pin 58 toward the inside of the piercing 485 and toward the housing 482. The slotted ring 55 therefore contributes an elastic return function returning the pin 58 toward its configuration in which it does not push the seal 59 back relative to its default closing off position, in which this seal 59 closes off the drain passage.

In this embodiment, the slotted ring 55 constitutes a control member that acts directly on the seal 59, this control member itself being moved by the piston 54 and the pin 58 when it is necessary to open the drain passage. In this embodiment, the force to be exerted to create the leak is greater than in the first and third embodiments, since the force to be exerted to deform the slotted ring is added to the force to be exerted to move the parts 54 and 58 and to deform the O-ring 59.

FIG. 12 shows certain component parts of the coupling element in this embodiment. For clarity of the drawing, the seal 52 is omitted in this figure. It will be noted that if the slotted ring 55 is removed, this figure could also relate to the first and second embodiments.

In the embodiment of FIGS. 13 to 17, the piston 54 acts directly on the seal 59, which is also received in a groove 484 of the plunger 48. This groove has a trapezoidal section.

References Y4 and Z4 respectively denote two axes perpendicular to the axis X4 and perpendicular to one another.

As shown in FIG. 14, the bottom of the groove 484 has an elongated section with its largest transverse dimension parallel to the axis Y4. The seal 59, which has a circular shape by default, is deformed to adopt the same shape as the bottom of the groove 484 in the plane of FIGS. 14 and 16. At two opposite zones that are aligned along the axis Z4, the bottom of the groove 484 is provided with two piercings 485 that place the groove 484 in communication with the first housing 482.

The housing 482 and the piston 54 have a flattened shape with their largest transverse dimensions parallel to the axis Z4.

Furthermore, the piston 54 is provided with two notches 546 that each form a partial freeing space of the seal 59 in its default closing off position, which corresponds to the configuration of FIG. 1 for the first embodiment and which is shown in FIGS. 13 and 14. Thus, in this embodiment, the control member is the piston 54, which acts directly on the seal 59.

The spring 56 is engaged in a blind hole 548 of the piston 54.

In the default configuration closing off the drain passage, the engagement of the seal 59 in the notches 546 results in closing off the piercings 485, such that the drain passage, formed by volumes of the groove 484, of the piercings 485 and the housing 482, is closed.

When the piston 54 is pushed back against the elastic force exerted by the spring 56, by a force shown by arrow F5 in FIG. 15, in particular when the front face 4A of the coupling element is made to bear against the front face of a complementary coupling element, the notches 546 of the piston 54 are angularly offset relative to the groove 484, which results in pushing the seal 59 back radially outward relative to the axis X4, pushing it to around the outer radial surface 544 of the piston 54 and creating, at the passages 485, a leak that opens the drain passage and allows the fluid contained in the coupling element to flow outward, as shown by arrows F4 in FIG. 15. FIG. 16 shows that the seal 59 locally unsticks from the bottom of the groove 484, which facilitates the appearance of the opening leak of the drain passage.

In this embodiment, the engagement of the seal 59 in the notches 546 contributes to retaining the piston 54 in the housing 482.

Alternatively, the notches 546 can be replaced by zones where the piston 54 has a locally reduced dimension along the axis Z4, up to the rear end of the piston. In other words, two shoulders are formed in the upper and lower part of the piston in FIGS. 13 to 16. According to another alternative, a zone with reduced transverse dimensions along the axes Y4 and Z4 can be provided near the rear end of the piston 54. In both cases, the seal 59 can be partially freed in this or these zones when it is in the position closing off the drain passage. The seal does not block the piston against the action of the spring 56, and a complementary stop member is provided, in particular in the form of a key inserted just below the surface, between the housing 482 and the piston 54.

Figure 18:
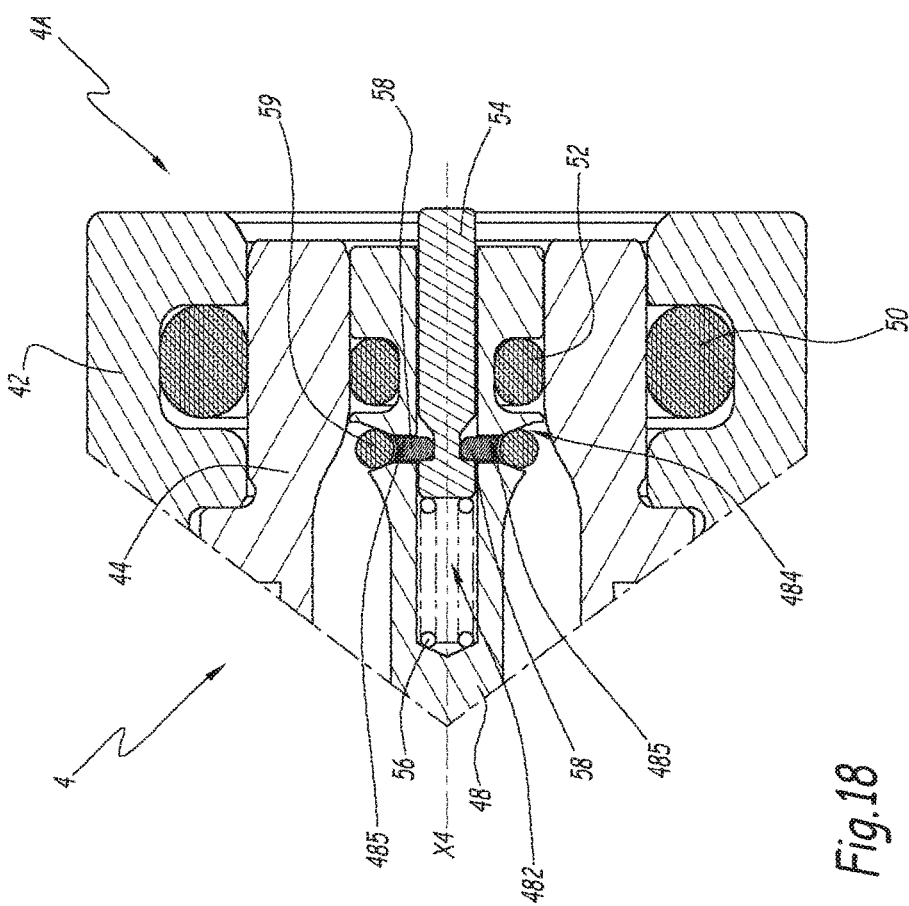
FIG. 18 is a partial sectional view similar to FIG. 2 for a coupling element according to a sixth embodiment of the invention.

In the sixth embodiment shown in FIG. 18, two pins 58 are used to control the positioning of the seal 59 relative to the groove 484. Two piercings 485 are provided, which makes it possible to create a leak in two locations distributed around the axis X4. In the example of FIG. 18, two pins 58 are used. Alternatively, more than two pins 58 and more than two piercings 485 can be used, these preferably being regularly distributed around the axis X4. In this embodiment, the force necessary to create the leak is greater than in the first embodiment, inasmuch as the seal 58 must be deformed in several places to create the leak.

The invention is described above in the case where the groove 484 has a trapezoidal or semicircular section. It may also be implemented with a groove having an asymmetrical section.

Irrespective of the embodiment, when the male and female elements are uncoupled from the coupler, the spring 56 or 76 pushes the pin 54 or 74 back toward the front face 4A or 6A, i.e., toward the default position. In this position, the groove 542 or 742 or the notches 546 of the piston are once again aligned with the seal 59 or 79, which can regain its default closing off position where it closes off the drain passage. In this position, the pistons 54 and/or 74 are once again accessible to an operator and ready to be actuated.

In the examples of FIGS. 1 to 12 and 18, the pins 58 and 78 move only in a radial direction to the axes X4 or X6. Alternatively, the movement can be oblique relative to these axes, i.e., both radial and axial.

The invention is also applicable to a coaxial coupling whereof the male and female elements define two pressurized fluid passages, like that known from PCT/EP2015/078007. In particular, the elements 54, 58 and 59 of the invention can replace the bead of the male element of this known coupler.

The seals 59 and 79 have a circular section. Alternatively, this section is not circular.

According to another alternative, the pins 58 and/or 78 can be replaced by control members having another geometry, such as beads, buttons, latches able to deform and locally move the seals 59 and/or 79.

In place of the pin 58 or 78 or the seal 59, or as an addition thereto, other means for retaining the piston 54 or 74 in the housing 482 or 642 can be provided, for example in the form of a screw or key.

The spring 56 or 76 can be replaced by another elastic return means, for example a deformable tongue.

In the embodiments of FIGS. 1 to 12 and 18, the groove 542 or 742 can be replaced by a localized overthickness of the piston 54 or 74, as long as the piston is angularly indexed around the axis X4 or X6 so that this overthickness is aligned with the piercing(s) 485 or 645. In this case, the passage of the overthickness at the seal 59 or 79 results in unsticking the seal from the bottom of the groove 484 or 644 and opening the piercing 485 or 645.

Irrespective of the considered embodiment or alternative, the compact structure of the mechanism for opening the drain passage allows it to be installed within a coupling element having a relatively small diameter and that is easy to maneuver when coupling the male and female elements of the quick coupler.

The invention applies to coupling elements and couplers for liquid or gaseous fluids.

The features of the embodiments and alternatives considered above can be combined to create new embodiments of the invention.

The invention claimed is:

1. A male or female quick coupling element intended to be coupled to a pressurized fluid pipe and comprising:
   a body defining at least one pressurized fluid passage, a front face and a longitudinal axis of the coupling element;
   an inner part arranged in the body, which is provided with a surface belonging to the front face, as well as a drain passage coupling the pressurized fluid passage and a volume outside of the coupling element; and
   an opening mechanism actuated from the front face of the coupling element to open the drain passage,
   wherein:
   the inner part is provided with a peripheral groove in which a seal rests that, in a closing off portion, closes off the drain passage;
   the opening mechanism is mounted on the inner part and comprises at least one control member for controlling the position of the seal relative to the groove, the control member being movable between a first inactive position, where the control member does not move the seal relative to its closing off position, and a second active position, where the control member acts directly on the seal to open the drain passage.

2. The male or female quick coupling element according to claim 1, further comprising:
   a plunger that is stationary relative to the body;
   a flap that is movable relative to the body between a position bearing against a seat defined in part by the plunger and situated on the side of the front face of the male or female coupling element, where the flap closes off the pressurized fluid passage, and a position separated from the seat, where together with the seat, the flap defines a pressurized fluid passage section;
   and wherein the inner part equipped with the peripheral groove and the seal is formed either by the flap or by the plunger.

3. The male or female quick coupling element according to claim 1, wherein the control member is actuated, going from its first inactive position to its second active position, by a piston arranged in a first housing of the inner part, the piston being movable in the first housing parallel to the longitudinal axis and intended itself to be actuated from the front face.

4. The male or female quick coupling element according to claim 3, wherein the control member is a pin arranged in a second housing of the inner part and radially movable relative to the longitudinal axis, between its first inactive position and its second active position, under action of a cam surface of the piston.

5. The male or female quick coupling element according to claim 1, wherein the control member is a slotted ring arranged between the seal and a bottom of the groove of the inner part.

6. The male or female quick coupling element according to claim 5, wherein the control member is actuated, going from its first inactive position to its second active position, by a piston arranged in a first housing of the inner part, the piston being movable in the front housing parallel to the longitudinal axis and actuated from the front face and wherein the slotted ring is movable, between its first inactive position and its second active position, under the action of at least one pin arranged in a second housing of the inner part and which is radially movable relative to the longitudinal axis, between a first inactive position and a second active position, under action of a cam surface of the piston.

7. The male or female quick coupling element according to claim 3, further comprising means for elastically stressing the piston toward a position where the piston does not actuate the control member and where the piston can be actuated from the front face.

8. The male or female quick coupling element according to claim 1, wherein the control member is a piston arranged in a first housing of the inner part, the piston being movable in the first housing and actuated from the front face.

9. The male or female quick coupling element according to claim 8, wherein the piston is movable parallel to the longitudinal axis and defines at least one partial release space of the seal, in the inactive position of the piston.

10. The male or female quick coupling element according to claim 8, further comprising means for elastically stressing the piston toward a position where the piston does not actuate the control member and where the piston can be actuated from the front face.

11. The male or female quick coupling element according to claim 3, wherein the drain passage comprises at least the first housing of the inner part.

12. The male or female quick coupling element according to claim 1, wherein the peripheral groove has a trapezoidal, semi-circular or asymmetrical section.

13. The male or female quick coupling element according to claim 1, further comprising a member for retaining the seal in the peripheral groove.

14. The male or female quick coupling element according to claim 1, wherein the drain passage emerges on the front face of the coupling element.

15. The male or female quick coupling element according to claim 1, wherein the control member is movable in the drain passage.

16. A quick coupler for removably joining pressurized fluid pipes, the quick coupler comprising a male element and a female element, wherein at least one of the male and female elements is the male or female quick coupling element according to claim 1.

17. The male or female quick coupling element according to claim 13, wherein the member for retaining the seal in the peripheral groove is a ring secured to the inner part.

* * * * *